US010527426B2

(12) United States Patent
Somieski

(10) Patent No.: US 10,527,426 B2
(45) Date of Patent: *Jan. 7, 2020

(54) SYSTEM FOR AND METHOD OF DETERMINING ANGULAR POSITION OF A VEHICLE

(71) Applicant: u-blox AG, Thalwil (CH)

(72) Inventor: Alexander Somieski, Oberrieden (CH)

(73) Assignee: u-blox AG (CH)

( * ) Notice: Subject to any disclaimer, the term of this patent is extended or adjusted under 35 U.S.C. 154(b) by 203 days.

This patent is subject to a terminal disclaimer.

(21) Appl. No.: 15/699,537

(22) Filed: Sep. 8, 2017

(65) Prior Publication Data
US 2018/0017391 A1 Jan. 18, 2018

Related U.S. Application Data

(63) Continuation of application No. 15/199,024, filed on Jun. 30, 2016, now Pat. No. 9,791,279.

(51) Int. Cl.
| | |
|---|---|
| *G01C 21/16* | (2006.01) |
| *B60W 40/10* | (2012.01) |
| *G01C 9/06* | (2006.01) |
| *G01C 21/12* | (2006.01) |

(Continued)

(52) U.S. Cl.
CPC ............. *G01C 21/165* (2013.01); *B60T 8/24* (2013.01); *B60W 40/10* (2013.01); *G01C 9/00* (2013.01); *G01C 9/06* (2013.01); *G01C 21/12* (2013.01); *B60W 2520/105* (2013.01); *B60W 2520/125* (2013.01); *B60W 2520/14* (2013.01); *B60W 2520/16* (2013.01); *B60W 2520/18* (2013.01); *B60W 2550/142* (2013.01)

(58) Field of Classification Search
None
See application file for complete search history.

(56) References Cited

U.S. PATENT DOCUMENTS

| | | |
|---|---|---|
| 5,446,658 A | 8/1995 | Pastor et al. |
| 6,714,851 B2 | 3/2004 | Hrovat et al. |
| 8,532,899 B1 | 9/2013 | Loomis |

(Continued)

FOREIGN PATENT DOCUMENTS

EP    1315945 B1    3/2010

OTHER PUBLICATIONS

Vaganay et al., Attitude Estimation for a Vehicle Using Inertial Sensors, Control Engineering Practice, vol. 2, No. 2, pp. 281-287, Mar. 1994.

(Continued)

*Primary Examiner* — Anne Marie Antonucci
(74) *Attorney, Agent, or Firm* — Westberg Law Offices

(57) ABSTRACT

A system for and method of determining angular position (e.g. pitch) of a vehicle. In accordance with an embodiment, a first angular rate of rotation of the vehicle about a first axis of rotation is detected using a first angular rate sensor mounted to the vehicle. A second angular rate of rotation of the vehicle about a second axis of rotation is detected using a second angular rate sensor mounted to the vehicle. The second axis of rotation is substantially orthogonal to the first axis of rotation. The angular position of the vehicle is determined based on a ratio of the first angular rate of rotation of the vehicle and the second angular rate of rotation of the vehicle.

37 Claims, 8 Drawing Sheets

(51) Int. Cl.
*G01C 9/00* (2006.01)
*B60T 8/24* (2006.01)

(56) References Cited

U.S. PATENT DOCUMENTS

| | | | |
|---|---|---|---|
| 8,589,015 B2 | 11/2013 | Willis et al. | |
| 2002/0022924 A1 | 2/2002 | Begin | |
| 2002/0183899 A1* | 12/2002 | Wallner | B60R 21/013 |
| | | | 701/1 |
| 2003/0130778 A1* | 7/2003 | Hrovat | B60R 16/0233 |
| | | | 701/45 |
| 2013/0192074 A1* | 8/2013 | Shaltiel | G01C 21/08 |
| | | | 33/303 |
| 2016/0040992 A1* | 2/2016 | Palella | G01C 21/165 |
| | | | 702/152 |

OTHER PUBLICATIONS

Fuke et al., Dead Reckoning for a Lunar Rover on Uneven Terrain, Proceedings of the 1996 IEEE Int'l. Conference on Robotics and Automation, vol. 1, pp. 411-416, Apr. 1996.

Ryu et al., Estimation of Vehicle Roll and Road Bank Angle, Proceedings of the 2004 American Control Conference, vol. 3, pp. 2110-2115, Jun. 2004.

* cited by examiner

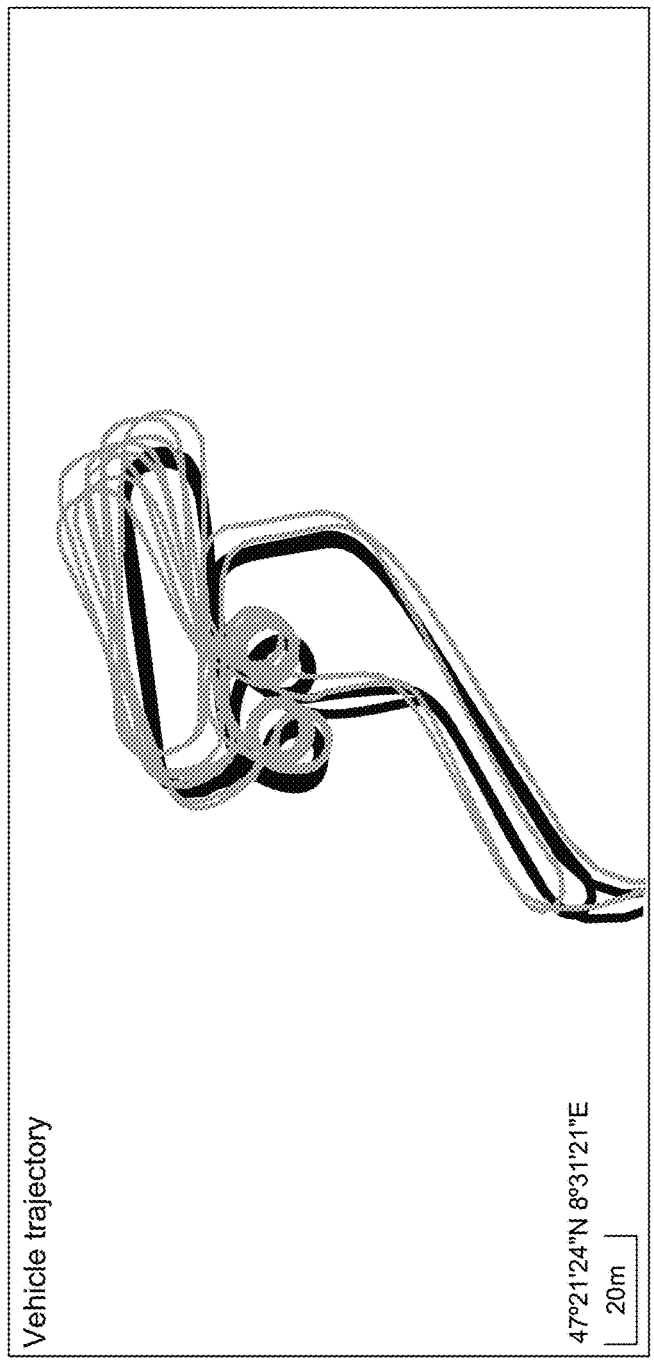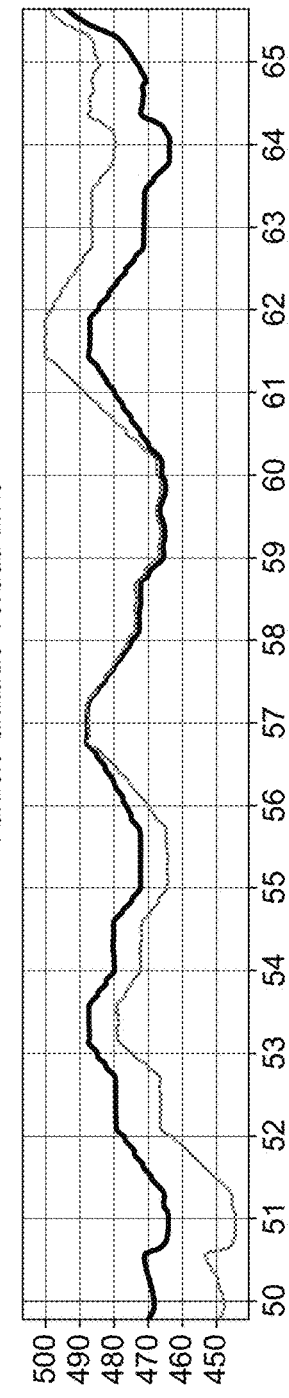
FIG. 9a
FIG. 9b

SYSTEM FOR AND METHOD OF DETERMINING ANGULAR POSITION OF A VEHICLE

This is a continuation of application Ser. No. 15/199,024, filed Jun. 30, 2016, the entire contents of which are hereby incorporated by reference.

BACKGROUND OF THE INVENTION

The present invention relates to the field of vehicle position sensing and, more particularly, the present invention relates to sensing an angular position of a vehicle, such as its roll, pitch or yaw.

Owing to their precision and accuracy, Global Navigation Satellite Systems (GNSS) have become the de facto standard for vehicle navigation solutions. However, in automotive applications, the prerequisite of having line-of-sight view of the sky is not always met. For instance, around high-rise buildings, dense foliage, in tunnels and under stacked roads and rooftops, GNSS reception is severely compromised.

Dead reckoning refers to the process of augmenting GNSS position fixes with additional sensor information to deduce the vehicle's position during GNSS outage. One type of sensor that is often used in dead reckoning is the vehicle wheel sensor, which can provide information on the distance travelled when GNSS signals are unavailable. Typically these count the number of wheel revolutions via an axle encoder placed on the wheel axle.

However, dead reckoning position updates based purely on wheel rotation have their limitations because vehicles can move in three dimensions. Take for instance a vehicle travelling a distance L up an incline of 30 degrees, as illustrated in FIG. 1. The wheel encoder would deduce a distance L from the start of the ramp although the actual distance travelled in the horizontal direction is only 0.87 L. Hence, the dead reckoning error is a 13% overestimate in the horizontal direction and no indication is provided of the distance travelled in the vertical direction. Using differential wheel rotation, e.g., a separate encoder on the left rear wheel and another encoder on the right rear wheel, can allow dead reckoning in two dimensions, however, this still does not provide any information about movement in the third dimension.

For this reason, many modern dead reckoning systems employ a host of additional sensors, such as accelerometers and gyroscopes, to detect vehicle movements. Having knowledge of the angular position of the vehicle can greatly improve the position estimate of the vehicle when GNSS signals are unavailable. In the foregoing example, having knowledge of the vehicle's pitch would allow a more accurate determination of the vehicle's position in three dimensions. As discussed in the following, there are various known techniques to determine the pitch of the vehicle.

Gyroscope Only Approach

In principal, a gyroscope perfectly aligned with the traverse axis (y-axis) of the body of a vehicle can be used to determine the vehicle's pitch. Although simple, there are several reasons why pitch determination based only on such a gyroscope measurement is not very accurate.

One issue associated with using gyroscopes is caused by the nature of the sensor itself. Gyroscopes only provide an angular rate and not an absolute measure of the angle. To obtain the latter, the output from the gyroscope needs to be integrated. However without knowledge of the initial conditions, i.e. the initial pitch of the body in which the gyroscope is mounted, the calculated output will be in error unless the initial pitch of the body is zero at t=0.

Secondly, since gyroscopes only indicate a rate of change of angular displacement, the measurements in some circumstances are of extremely short duration. Imagine for instance a vehicle traversing from level ground onto a ramp with a constant slope. The output of a y-axis gyroscope would register the change in pitch angle at the instant the vehicle enters the ramp. However, this measurement would only exist for a very short duration before returning to zero as the vehicle climbs the ramp. The very short duration of the measurement makes it challenging to obtain reliable results, especially if the pitch is used to deduce the vehicle's altitude.

Multi-Sensor Approach

More commonly, gyroscopes are used together with accelerometers for more accurate determination of angular position. In determining the pitch of a vehicle, accelerometers often provide more reliable results. In the case of a vehicle traversing a ramp as discussed earlier, an accelerometer would continuously provide a measurement while travelling up the constant incline even though the pitch hasn't changed. This is because the accelerometer provides a measurement of the accelerations the vehicle is experiencing.

One way of taking advantage of both types of sensors to determine an accurate pitch angle involves calculating the difference of the two angles determined by each type of sensor and feeding back this 'error' difference to correct the pitch angle measured by the gyroscope sensor. The output of the gyroscope is integrated as before, except this time it is correlated with information indirectly gathered from the accelerometer sensor.

Accelerometer Only Approach

The pitch of a stationary or non-accelerating vehicle can also be determined using a single accelerometer. For example, an accelerometer sensing longitudinal (x-axis) acceleration of a vehicle parked or moving with constant velocity along an incline can be used to directly deduce the incline angle or pitch of the vehicle (according to $A_X = 1$ g×sin(θ), where $A_X$ denotes the accelerometer output and θ is the pitch of the vehicle). However, such a determination is only accurate when the sensor is oriented correctly in the vehicle. Otherwise, any rotation about the other axes affects the magnitude of the acceleration sensed along the vehicle's x-axis and thus introduces an error into the pitch calculation. Furthermore, if the vehicle is moving with non-zero acceleration, a means is additionally required to determine the acceleration of the vehicle due to its own forward motion. This extra component of acceleration then needs to be accounted for and subtracted from the acceleration sensed by the accelerometer.

What is needed are improved techniques for determining the angular position of a vehicle.

SUMMARY OF THE INVENTION

The present invention provides a system for and method of determining angular position (e.g. pitch) of a vehicle. In accordance with an embodiment, a first angular rate of rotation of the vehicle about a first axis of rotation is detected using a first angular rate sensor mounted to the vehicle. A second angular rate of rotation of the vehicle about a second axis of rotation is detected using a second angular rate sensor mounted to the vehicle. The second axis of rotation is substantially orthogonal to the first axis of rotation. The angular position of the vehicle is determined based on a ratio of the first angular rate of rotation of the vehicle and the second angular rate of rotation of the vehicle.

In accordance with a further embodiment of the present invention, a first angular rate of rotation of the vehicle about a first axis of rotation is detected using a first angular rate sensor mounted to the vehicle. A second angular rate of rotation of the vehicle about a second axis of rotation is detected using a second angular rate sensor mounted to the vehicle. The second axis of rotation is substantially orthogonal to the first axis of rotation. The angular position of the vehicle is estimated using the first angular rate of rotation of the vehicle and the second angular rate of rotation of the vehicle. A change in location of the vehicle is estimated using the estimated angular position of the vehicle.

BRIEF DESCRIPTION OF THE DRAWINGS

The present invention is described with respect to particular exemplary embodiments thereof and reference is accordingly made to the drawings in which:

FIGS. 9a-b illustrate vehicle movement in a car park obtained in accordance with an embodiment of the present invention.

DETAILED DESCRIPTION OF A PREFERRED EMBODIMENT OF THE INVENTION

Figure 1:
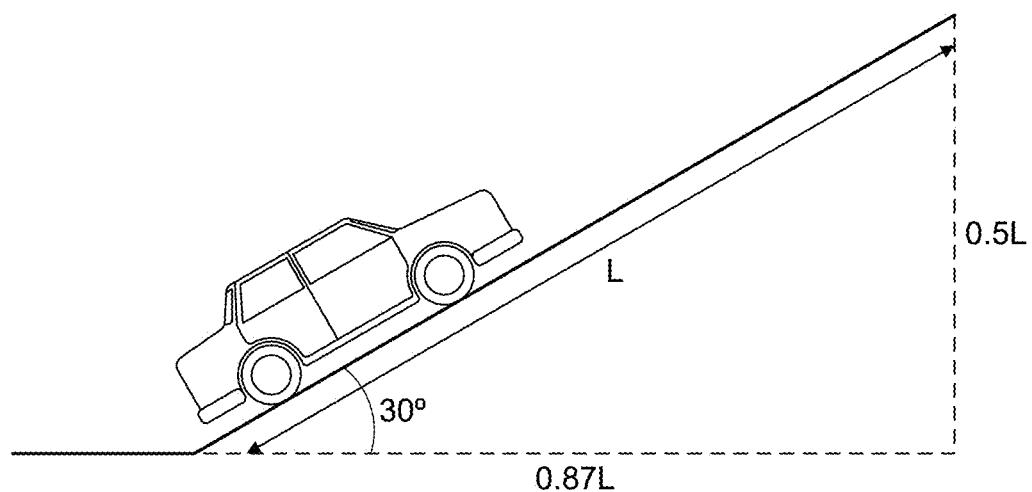
FIG. 1 illustrates a vehicle deploying a wheel sensor for dead reckoning in accordance with conventional methods.

The present invention provides a system for and method of determining angular position of a vehicle. As an illustrative example, the present invention is described herein in connection with determining angular position of an automobile. However, the vehicle can be any object capable of movement from one place to another and of experiencing change in angular position and that is of sufficient size that angular rate sensors described herein can be mounted thereto. Examples of such vehicles include, but are not limited to, land vehicles (including automobiles, trucks and construction equipment), aircraft (including airplanes and helicopters) and watercraft (including submersibles). The determined angular position can be any one or more of roll, pitch or yaw. For reference, the vehicle is considered to have a longitudinal axis, a transverse axis and a vertical axis. The origin of all three axes may be defined to be the center of the vehicle (e.g., its center of gravity). However, other definitions are possible. For example, the middle of the rear axle of an automobile may be defined to be the origin of the axes.

The longitudinal axis (also referred to as the x-axis or roll axis) extends from the origin and exits the front of the vehicle. Thus, the vehicle's straight-line forward motion is generally aligned with the longitudinal axis. The angular position of the vehicle about the longitudinal axis is referred to as "roll." In the case of an automobile, roll refers to lateral tilt experienced by the vehicle for instance when it negotiates a curve and or banked roadway. The transverse axis (also referred to as the y-axis or pitch axis) extends from the origin, exits the right side of the vehicle (starboard side of a boat) and is orthogonal to the longitudinal axis. The angular position of the vehicle about the y-axis is referred to as "pitch" and indicates the extent to which the vehicle has a nose-up attitude (positive pitch) or nose-down attitude (negative pitch). The vertical axis (also referred to as the z-axis or yaw axis) extends from the origin, exits the bottom of the vehicle and is orthogonal to both the longitudinal axis and the transverse axis. The angular position of the vehicle about the z-axis is referred to as "yaw" or heading.

The present invention involves obtaining angular rate sensor measurements about two of the three orthogonal axes of the vehicle and using those measurements to estimate the angular position of the vehicle about a third axis. The angular position is estimated without requiring the use of accelerometers. For example, the vehicle pitch (angular position about the y-axis) can be determined if measurements from an x-axis (roll) sensor and a z-axis (yaw) sensor are available and if a significant yaw rate is observed. This approach enables a change in altitude determination in dead reckoning mode and provides the possibility to improve the accuracy of the heading as well. No accelerometers are required. The performance can be improved further if the estimated pitch is used to align the sensor axes to the axes of the vehicle frame to account for any misalignment.

As another example, the vehicle roll (angular position about the x-axis) can be determined if measurements from a y-axis (pitch) sensor and a z-axis (yaw) sensor are available and if a significant yaw rate is observed.

Figure 2:
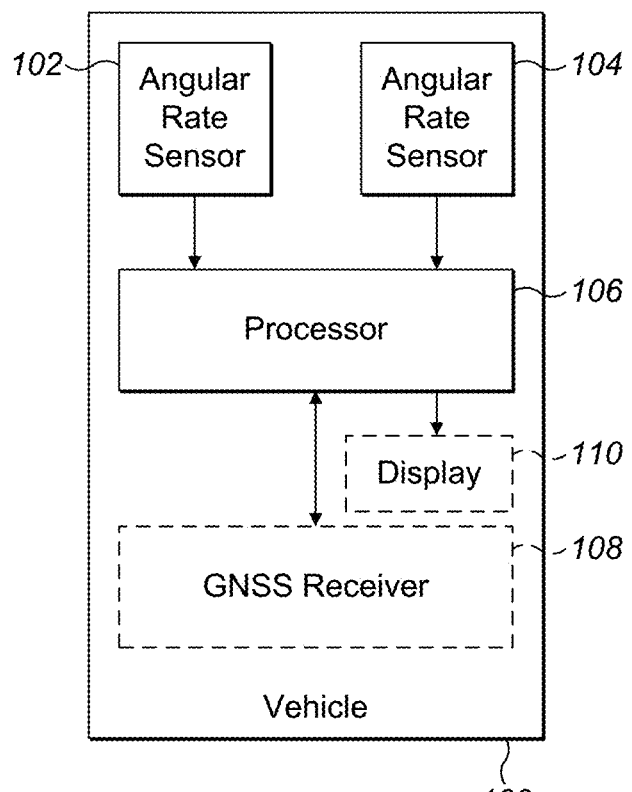
FIG. 2 illustrates a block schematic diagram of a system for determining an angular position of a vehicle in accordance with an embodiment of the present invention.

FIG. 2 illustrates a block schematic diagram of a system for determining angular position of a vehicle 100 in accordance with an embodiment of the present invention. The vehicle 100 has mounted thereon a first angular rate sensor 102 and a second angular rate sensor 104. The first angular rate sensor 102 and the second angular rate sensor 104 are preferably mounted to the vehicle such that their measurement axes are substantially parallel to the vehicle body axes and substantially orthogonal to each other. A processor 106 is configured to receive measurement data signals from the first angular rate sensor 102 and the second angular rate sensor 104. The processor 106 is further configured to compute an estimate of the angular position of the vehicle based on the sensor data signals. The angular rate sensors 102 and 104 can include gyroscopes or gyroscope equivalents, including but not limited to, MEMS gyroscope, fiber optic gyroscope, vibrating structure gyroscope, or other type of angular rate sensor. Moreover, the first and second angular rate sensors 102 and 104 can be housed together as a unit, for example, they can be implemented as a dual-axial gyroscope.

As explained herein, the processor 106 can additionally determine a change in location of the vehicle using the estimated angular position of the vehicle. For example, the processor 106 can use the estimated angular position, along with other information such as vehicle speed information obtained from, for example, wheel rotation sensors or a speedometer, to estimate a change in location of the vehicle. In dead reckoning mode, the processor 106 can determine estimates of current locations of the vehicle based on an initial location and an initial angular position of the vehicle obtained from GNSS signals and the estimated angular position of the vehicle obtained based on information from the sensors 102 and 104. Thus, as shown in FIG. 2, the vehicle can optionally include a GNSS receiver 108 in communication with the processor 106 in order to obtain GNSS information that can be used by the processor 106 in conjunction with other information.

A display 110 can optionally be provided within the vehicle 100 to display estimated vehicle angular positions and location information to an operator of the vehicle 100. Such information can alternatively or additionally be communicated to a remote location (e.g., a remote server communicatively coupled to the vehicle 100 via cellular or wireless signaling) for collecting, saving and potentially performing additional processing on the information.

Figure 3:
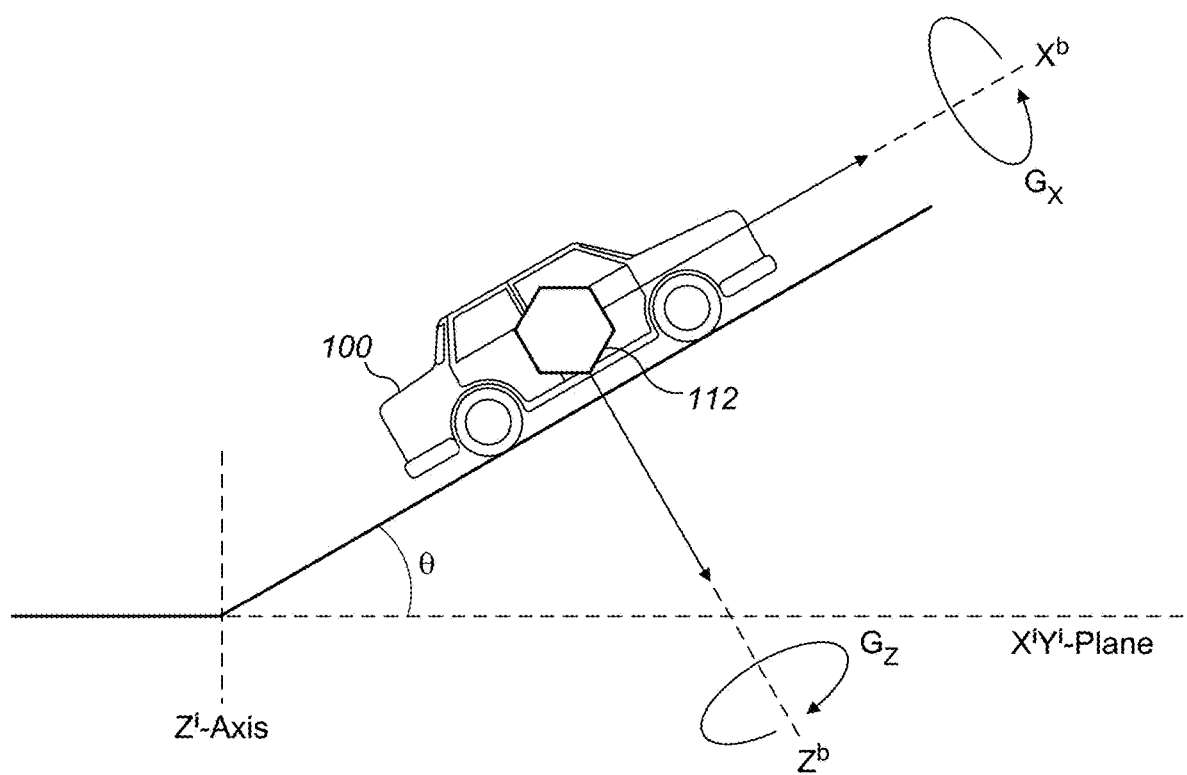
FIG. 3 illustrates a vehicle for which pitch is determined in accordance with an embodiment of the present invention.

FIG. 3 shows a vehicle 100 for which angular position, namely pitch, can be determined in accordance with the present invention. In this exemplary embodiment, the first angular rate sensor 102 is aligned with the roll axis (x-axis) of the vehicle 100 while the second angular rate sensor 104 is aligned with the yaw axis (z-axis) of the vehicle 100. The angular rate sensors 102 and 104 measure the angular rates of rotation about their respective axis. As shown in FIG. 3, the angular rate sensors 102 and 104 can be incorporated into a dual-axial sensor 112. Note that two coordinate systems are shown in FIG. 3, namely, an inertial reference frame $(X_i, Z_i)$ and a vehicle body frame $(X_b, Z_b)$. These two frames are described further under the mathematical derivation given herein.

Pitch Determination Using Two Angular Rate Sensors

As explained herein, using solely a traverse or y-axis gyroscope to determine the pitch of a vehicle is usually inaccurate and therefore avoided. The present invention is based on the realization that under certain circumstances two orthogonally positioned gyroscopes can be used to accurately determine the pitch of a vehicle. Specifically, when a vehicle experiences significant rotation (or yaw) around its vertical axis (z-axis), an accurate pitch determination can be provided by a longitudinally (x-axis) positioned gyroscope and a vertically (z-axis) positioned gyroscope in the vehicle body according to:

$$\theta = \tan^{-1}\left(\frac{-G_X}{G_Z}\right) \quad (1)$$

where θ represents the pitch of the body (vehicle) in which the gyroscopes are mounted and $G_X$ and $G_Z$ are the measurements from the longitudinal (or x-axis gyroscope) and the vertical (or z-axis gyroscope), respectively.

Figure 4:
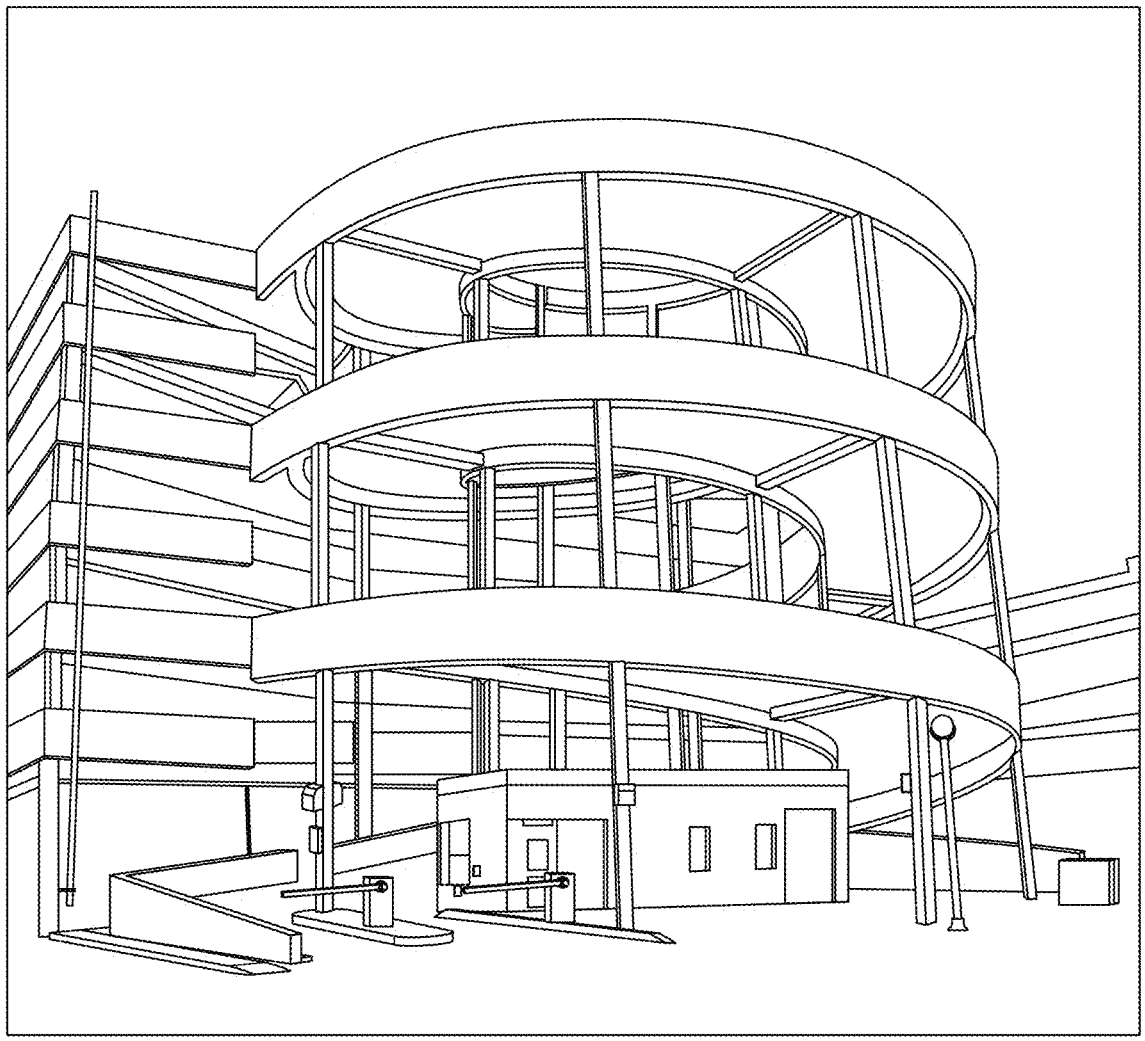
FIG. 4 illustrates a spiral car ramp upon which a traveling vehicle's angular position can be determined in accordance with an embodiment of the present invention.

The only assumptions are that the vehicle experiences a significant rotation around the vertical axis (z-axis) and the rate of change of roll around the traverse axis (x-axis) of the vehicle (and the roll angle itself) is negligible. The first assumption will be valid whenever the vehicle is turning while travelling, for example ascending or descending a spiral ramp in a car park. FIG. 4 illustrates an exemplary spiral car ramp upon which a traveling vehicle's angular position can be determined.

The second assumption is generally true for most road surfaces over which vehicles travel. This is because roads are purposely built to minimize vehicle roll and thus roll angles are usually negligible.

The invention has three key advantages. The first is that it allows accurate pitch determination in vehicles without deployment of accelerometers. This is particularly useful in applications where only gyroscopes are available. Secondly, compared to the single accelerometer approach described earlier, acceleration information is not required in the pitch determination even if the vehicle is moving with non-uniform motion. Thirdly, having accurate pitch information allows for an improved heading determination of the vehicle when ascending or descending as explained herein.

Mathematical Derivation

In order to show the validity of equation (1) it is useful to define two coordinate frames, namely an inertial reference frame and a vehicle body frame. The inertial reference frame is a stationary set of axes in a fixed position with respect to the earth. For the purposes of the derivation and discussion, a common aerospace inertial reference frame is adopted where the x-axis points north, the y-axis points east and the z-axis points below (known as the North-East-Down or NED reference frame). Note that because the z-axis is defined as downwards, any altitude above ground is negative.

In most applications, the axes of sensors such as gyroscopes are made to coincide with the axes of the moving platform in which the sensors are mounted, e.g. a vehicle. In the following derivation the vehicle body frame x-axis is defined as pointing out of the vehicle's windscreen, the y-axis points laterally through the vehicle doors and the body frame z-axis points downwards beneath the vehicle. The sensor frame coincides with the body frame though, as discussed herein, there can be misalignment between the vehicle body frame and sensor frame.

The sensors (e.g. gyroscopes) mounted on the vehicle report rotation rates with respect to the vehicle body frame. Thus in order to determine the Euler Angle rates of the vehicle, i.e. the pitch rate, $\dot{\theta}$, the roll rate, $\dot{\phi}$ and the yaw rate, $\dot{\psi}$, it is first necessary to convert them to measurements made by the sensors in the appropriate coordinate frame, i.e. to the inertial reference frame. This can be done by performing a series of transformations. The transformation matrix for converting angular rate measurements made by sensors on the vehicle's body to Euler angular rates in the inertial reference frame is given by $$D(\phi, \theta, \psi) = \begin{bmatrix} 1 & \sin\phi\tan\theta & \cos\phi\tan\theta \\ 0 & \cos\phi & -\sin\phi \\ 0 & \sin\phi/\cos\theta & \cos\phi/\cos\theta \end{bmatrix} \quad (2)$$

If $G_X$ represents the vehicle body frame x-axis sensor reading, $G_Y$ the vehicle body frame y-axis sensor reading and $G_Z$ the z-axis sensor reading, then it can be shown that the Euler Angle rates are given according to $$\begin{bmatrix} \dot{\phi} \\ \dot{\theta} \\ \dot{\psi} \end{bmatrix} = \begin{bmatrix} G_X + G_Y\sin\phi\tan\theta + G_Z\cos\phi\tan\theta \\ G_Y\cos\phi - G_Z\sin\phi \\ G_Y\sin\phi/\cos\theta + G_Z\cos\phi/\cos\theta \end{bmatrix} \quad (3)$$

Considering only the rate of roll component, i.e. the first row of the matrix in equation (3), it follows that $$\dot{\phi} = G_X + G_Y \sin\phi \tan\theta + G_Z \cos\phi \tan\theta \quad (4)$$

Under the assumption the roll and rate of change of roll are negligible, i.e.

$\phi \approx 0$ and $\dot{\phi} \approx 0$

Then equation [4] becomes $$0 = G_X + G_Z \tan \theta \qquad (5)$$

and rearranging equation (5) for the pitch $\theta$ finally yields $$\theta = \tan^{-1}(-G_X/G_Z)$$

as required by equation (1).

Roll Determination Using Two Angular Rate Sensors

The invention can be used to accurately measure roll of a vehicle. Specifically, angular position about the x-axis of the vehicle (roll) can be determined using a lateral (y-axis) gyroscope and a vertical (z-axis gyroscope).

Figure 5:
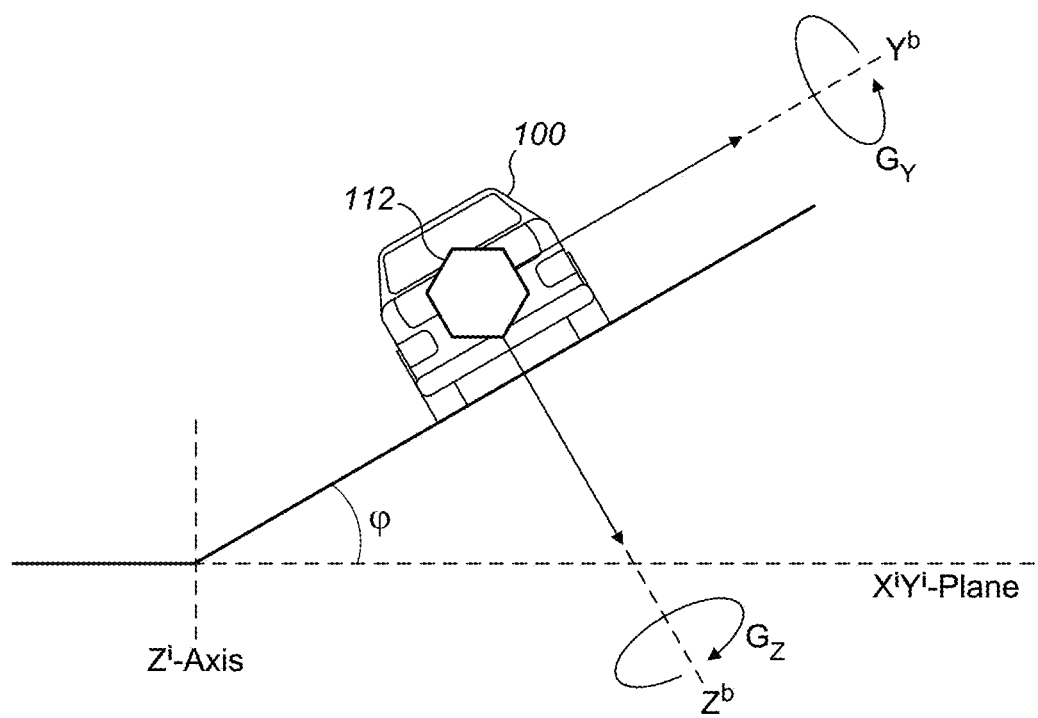
FIG. 5 illustrates a vehicle for which roll is determined in accordance with an embodiment of the present invention.

FIG. 5 shows a vehicle 100 for which roll can be determined in accordance with the present invention. In this exemplary embodiment, the first angular rate sensor 102 is aligned with the pitch axis (y-axis) of the vehicle 100 while the second angular rate sensor 104 is aligned with the yaw axis (z-axis) of the vehicle 100. The back of the vehicle 100 is shown in FIG. 5, as the vehicle is oriented as though it is travelling into the page. The angular rate sensors 102 and 104 measure the angular rates of rotation about their respective axis. Similarly to FIG. 3, two coordinate systems are shown in FIG. 5, namely, an inertial reference frame ($X_i$, $Z_i$) and a vehicle body frame ($X_b$, $Z_b$). Furthermore, the angular rate sensors 102 and 104 may be incorporated into a dual-axial sensor 112.

As with the pitch determination, a significant yaw rate should be present. In addition, the rate of change in pitch should be small. The mathematical derivation for roll determination is as follows:

Using the second row of matrix given previously in Equation (3) above:

$$\dot{\theta} = G_Y \cos\phi - G_Z \sin\phi \qquad (6)$$

Assuming constant pitch, i.e. rate of change of pitch to be negligible. Equation (6) becomes:

$$0 = G_Y \cos\phi - G_Z \sin\phi \qquad (7)$$

Rearranging equation (7) for the roll yields:

$$\frac{\sin\phi}{\cos\phi} = \frac{G_Y}{G_Z}$$

Hence the roll of the vehicle is determined by:

$$\phi = \tan^{-1}(G_Y/G_Z)$$

Sensor Misalignment Correction

To this point, any misalignment between the inertial sensor frame and the vehicle body frame has not been taken into account. For simplicity, it has been assumed that the sensors have been installed such that they are perfectly aligned with the vehicle. In other words, it has been assumed that the angular difference between the vehicle body frame and each gyroscope's axis of rotation is zero, i.e. the axes of the sensor frame are parallel to the axes of the vehicle body frame.

Figure 6:
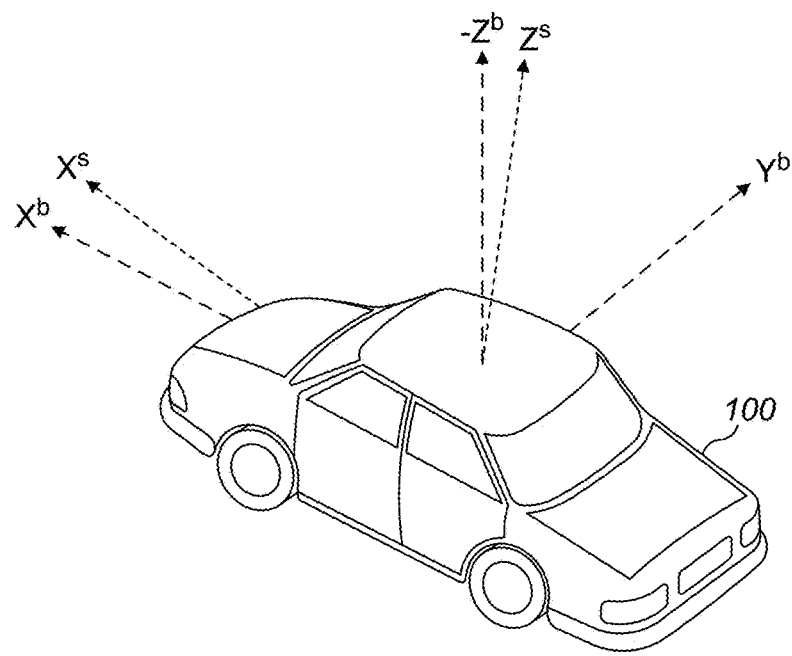
FIG. 6 illustrates a misalignment between a vehicle body frame and sensor frame that can be accounted for in accordance with an embodiment of the present invention.

In practice, there will almost always be some misalignment due either to imperfect mounting of the two or more gyroscopes within the sensors' housing or imperfect alignment of the sensor housing within the vehicle itself upon installation. FIG. 6 illustrates a misalignment between a vehicle body frame (b) and sensor frame (s) that can be taken into account. This misalignment will affect any angles determined from sensor measurements. Thus the observed pitch $\theta$ determined by equation (1) will consist of the true pitch $\theta_T$ of the vehicle and a pitch misalignment error $\Delta\theta_{err}$, i.e.

$$\theta = \theta_T + \Delta\theta_{err} \qquad (8)$$

Therefore, according to equation (8) in order to obtain an accurate value for the pitch of the vehicle, the error contribution $\Delta\theta_{err}$ due to sensor misalignment should be removed from the pitch determined by equation (1). The sensor misalignment is a single angle which represents the angular displacement between the vehicle body x-z plane and the sensor x-z plane. In simple terms, the pitch misalignment error $\Delta\theta_{err}$ is subtracted from every pitch angle derived to obtain the true pitch $\theta_T$ of the vehicle. This requires prior knowledge of the pitch misalignment error $\Delta\theta_{err}$.

The pitch misalignment error $\Delta\theta_{err}$ can be viewed as the fixed angle of rotation between the sensor frame of the real mounted gyroscopes and that of ideally mounted gyroscopes (which would be perfectly aligned with the vehicle body frame). One way to obtain the pitch misalignment error $\Delta\theta_{err}$ is to determine the vehicle pitch using a method that does not involve utilization of the onboard inertial sensors and compare the result with the pitch determined from using equation (1). For example, when GNSS signals are available one may deploy traditional positioning techniques to independently determine the pitch of the vehicle. This could be done initially at start-up of the system during a control or calibration drive before the sensors are configured for official use. Alternatively, the misalignment error could be continuously calibrated whenever GNSS signals are available in order to detect any variation of the sensor misalignment e.g. due to the change of the vehicle payload. It is important to note that the calibration drive need not be performed over level ground.

Rate of Change of Heading Correction

Figure 7:
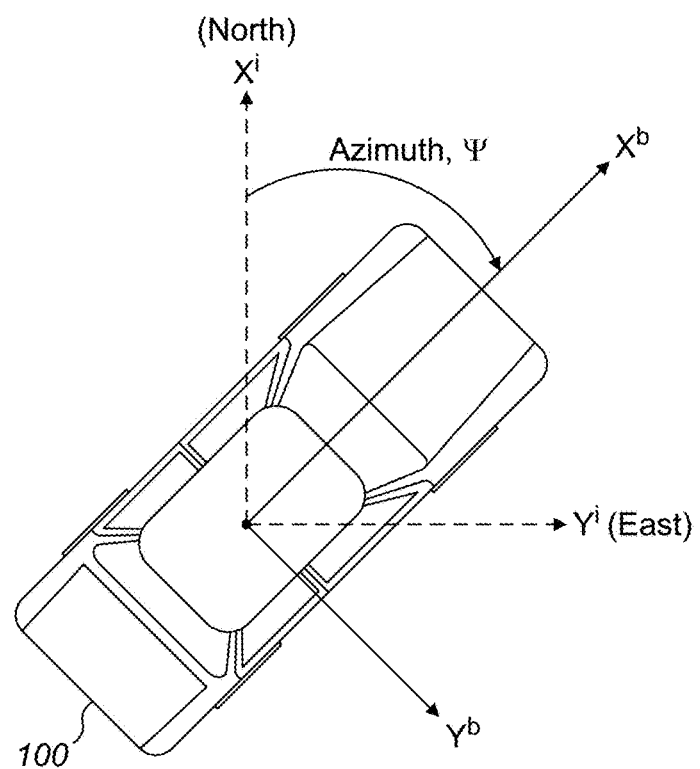
FIG. 7 illustrates a heading of a vehicle being determined by a z-axis angular rate sensor when travelling on flat ground in accordance with an embodiment of the present invention.

If the vehicle traverses over perfectly level ground, the reading from the vertical or yaw (z-axis) gyroscope will provide a direct indication of the vehicle's rate of change of heading $\dot{\psi}$ (also referred to as the turn or yaw rate). The heading or the direction the vehicle is travelling can hence be updated by integrating the vehicle's rate of change of heading if the initial heading $\psi_0$ is known. FIG. 7 shows the heading of the vehicle relative to the inertial reference and vehicle-body frames. Similarly, if the vehicle was to travel up an infinitely steep slope such as a wall (hypothetical situation), the reading from the roll (x-axis) gyroscope would indicate the vehicle's rate of change of heading or yaw rate. In these two orthogonal situations the reading on the other gyroscope would be zero, i.e. driving on level ground $G_Y=0$ and driving up a wall $G_Z=0$.

Only in these two circumstances do the gyroscope measurements given an accurate indication of the vehicle's rate of change of heading. However, in reality the ground over which a vehicle traverses is rarely completely flat and never infinitely steep. Consequently, the rate of change of heading information obtained from the sensors will usually have components in both the x-axis and z-axis directions.

Knowledge of the vehicle's pitch however can be used to 'correct' or resolve the vehicle's rate of change of heading when the vehicle is not traversing over level ground. Either of the following equations (9) or (10) will provide the vehicle's 'true' yaw rate $$\dot{\psi} = \frac{G_Z}{\cos\theta_T} \qquad (9)$$

$$\dot{\psi} = \frac{-G_X}{\sin\theta_T} \quad (10)$$

Although both equations will provide the true yaw rate, employment of equation (9) is preferred numerically because it doesn't return a discontinuity when the vehicle is travelling on level ground. In addition, for small pitch angles, the denominator will be typically larger and thus less influenced by systematic errors.

The pitch determination and, following, heading correction may be performed only if a significant rate of change in vehicle yaw is detected. For instance, a yaw rate threshold, e.g. of five degrees per second, might be defined such that corrections to the vehicle's heading are only carried out if the yaw rate exceeds this threshold. The definition of the threshold may be made with respect to the quality of the gyroscope measurements. A higher threshold might be set if the quality of the gyroscope measurements is low.

Altitude Propagation

Knowledge of the vehicle's true pitch also allows propagation of the vehicle's altitude independently of GNSS. This is particularly advantageous in scenarios where the vehicle is climbing/descending and satellite signals either unavailable or the reception of such signals is compromised. Examples of situations in which GNSS signals may be unavailable or compromised in connection with automobiles or trucks include ramps in multi-level car parks, curved ramps within tunnels, curved roads passing through valleys and canyons, such as mountain roads, roadways within open pit mining sites, urban environments where GNSS signals are blocked or impeded by structures like high-rise buildings, and other similar conditions.

The altitude just prior to the loss of GNSS signals, e.g., at the entrance to a car park or tunnel, will be available from the last position fix determined via GNSS or via a fused solution utilizing GNSS and sensor measurements. Thereafter, while GNSS signals are unavailable, e.g., after the vehicle enters the car park or tunnel, the new altitude can be calculated from $$z(t_1) = z(t_0) - v\Delta T \sin\theta_T \quad (11)$$

irrespective of whether GNSS signals are available. Here $z(t_1)$, $z(t_0)$, v and $\Delta T$ refer to the altitude of the vehicle at the current epoch, altitude at the previous epoch, velocity of the vehicle and time period between the two epochs, respectively. Note that a positive angle will return a negative height because the local inertial reference frame assumes downward travel along the z-axis. The velocity may be determined from the speedometer or a device which measures the number of wheel revolutions in a given time. The velocity may alternatively come from the last known velocity of the vehicle before GNSS reception was lost. Alternatively, the velocity may be determined from an accelerometer measurement, if one or more accelerometers are available.

Altitude propagation as described herein requires a GNSS receiver or some other means to measure absolute altitude, e.g. a barometer, and two angular rate sensors, such as a dual-axis (roll and yaw or XZ) gyroscope, fitted in the vehicle. Note that a tri-axis (roll, pitch and yaw or XYZ) gyroscope may also be employed where the pitch gyroscope is simply not used. In other words, a dual-axis of a tri-axis gyroscope may be utilized. This later implementation may be preferable due to the ubiquity of tri-axis gyroscopes and reduced costs from greater integration. If altitude information is desired then the implementation additionally requires a means to determining the velocity, e.g. input from a wheel sensor or a speedometer.

The altitude propagation and heading correction calculations can be performed in the receiver's firmware which resides on the host microprocessor inside the GNSS receiver. The pitch can be calculated as described herein.

As previously mentioned, the invention does not require the deployment of accelerometers. However, should accelerometers be additionally available, the pitch determination using gyroscopes as discussed above would provide an independent measurement which could be combined with the pitch determined from the accelerometers in order to obtain a more accurate and reliable pitch measurement.

Figure 8A:
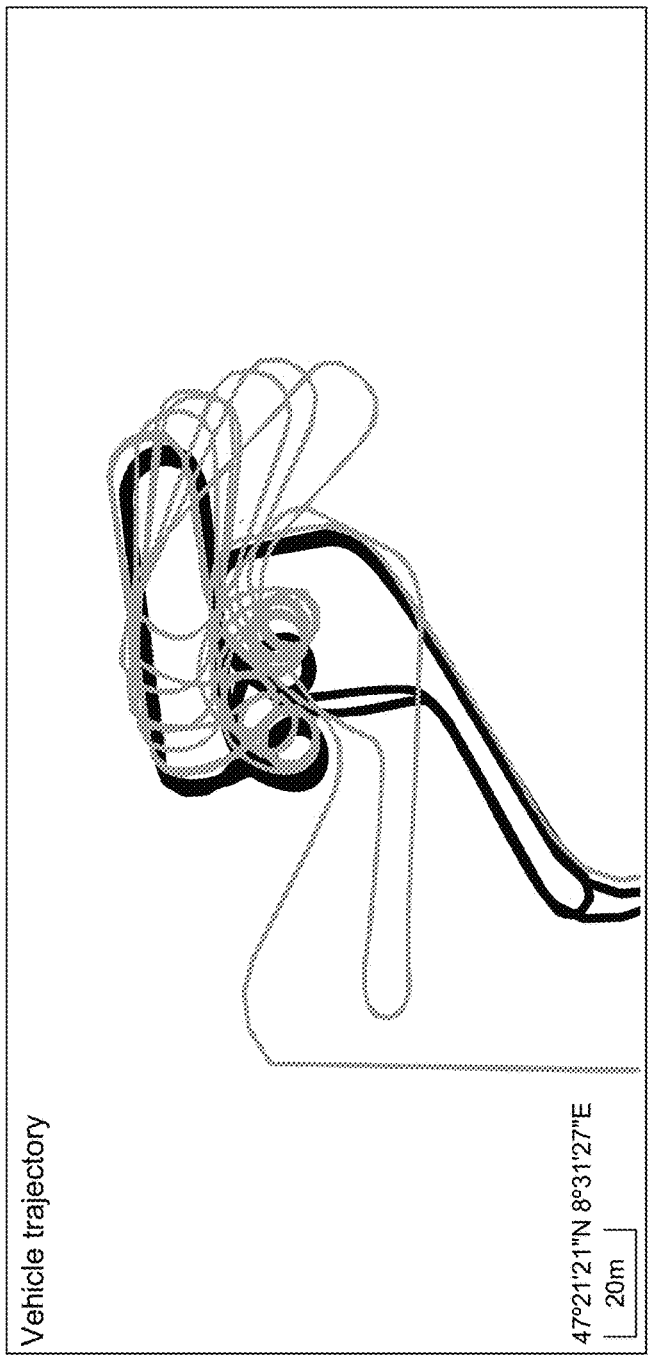
FIGS. 8a-b illustrate vehicle movement in a car park obtained without activation of the present invention.
Figure 8B:
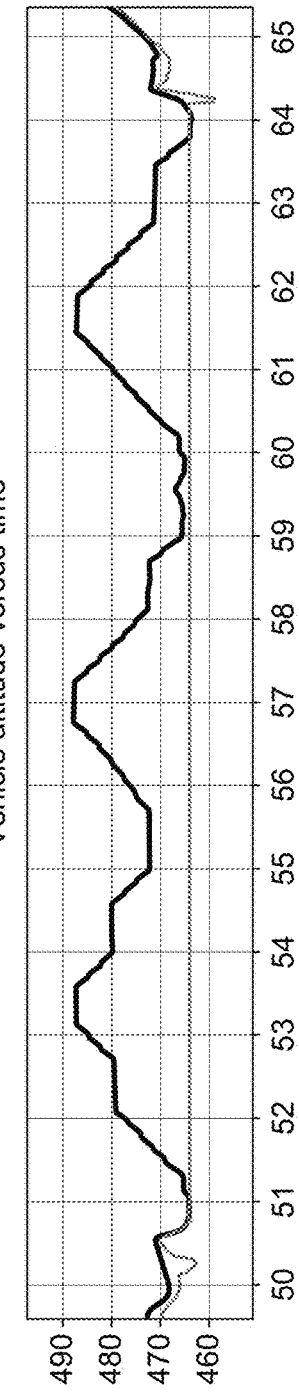
Figure 10A:
FIGS. 10a-b illustrate vehicle movement in a car park obtained with sensor misalignment correction in accordance with a further embodiment of the present invention.
Figure 10B:
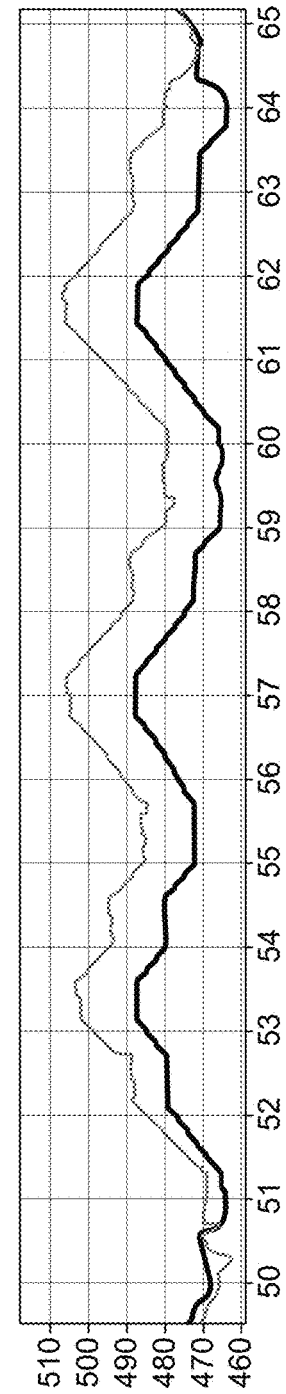

A series of test drives conducted in a car park using the invention is shown in FIGS. 8a-b, 9a-b and 10a-b. The black lines in each of FIGS. 8, 9 and 10 represent a control trajectory (or actual vehicle path), whereas the grey lines represent a computed trajectory of the vehicle. The top portions (FIGS. 8a, 9a and 10a) show latitude vs. longitude and represent a bird's eye view of the control vehicle trajectory (shown in the black lines) compared to a computed trajectory (shown in the grey lines). The bottom portions (FIGS. 8b, 9b and 10b) show altitude vs. time with the control vehicle altitude profile shown in the black lines compared to the computed altitude profile shown in the grey lines. FIGS. 8a-b show movement of the vehicle in the car park without the invention activated (gyroscopes are present but are not used to determine the pitch). Furthermore, the graph in FIG. 8b shows that altitude of the vehicle is not deduced, but is instead maintained constant while GNSS signals are unavailable and until GNSS signals are again available (at the exit of the park garage). FIGS. 9a-b show the same movement, this time using the gyroscopes to determine the pitch and the altitude, in accordance with the invention. Finally, FIGS. 10a-b show the invention with the additional feature of the sensor misalignment correction. Note that the vehicle uses wheel revolution sensors to determine the vehicle's velocity in the plots, which is needed to calculate the vehicle's altitude.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of determining an angular position of a vehicle, comprising:
    detecting a first angular rate of rotation of the vehicle about a first axis of rotation using a first angular rate sensor mounted to the vehicle;
    detecting a second angular rate of rotation of the vehicle about a second axis of rotation using a second angular rate sensor mounted to the vehicle, the second axis of rotation being substantially orthogonal to the first axis of rotation; and
    estimating the angular position of the vehicle based on a ratio of the first angular rate of rotation of the vehicle and the second angular rate of rotation of the vehicle.

2. The method according to claim 1, wherein the angular position comprises a pitch of the vehicle.

3. The method according to claim 2, further comprising estimating a change in altitude of the vehicle using the estimated pitch of the vehicle.

4. The method according to claim 2, further comprising estimating a position of the vehicle in three dimensions using the estimated pitch of the vehicle.

5. The method according to claim 2, further comprising resolving a rate of change of heading of the vehicle using the estimated pitch of the vehicle and wherein said resolving the rate of change of heading is performed only when a yaw rate of the vehicle exceeds a threshold yaw rate value.

6. The method according to claim 1, wherein the angular position comprises roll of the vehicle.

7. The method according to claim 1, wherein said first axis of rotation coincides with a roll axis of the vehicle and said second axis of rotation coincides with a yaw axis of the vehicle.

8. The method according to claim 7, wherein the vehicle experiences a rate of change of rotation about the first axis that is negligible while said detecting the first angular rate of rotation of the vehicle and said detecting the second angular rate of rotation of the vehicle are performed and wherein the vehicle travels upon a curved ramp while said detecting the first angular rate of rotation of the vehicle and said detecting the second angular rate of rotation of the vehicle are performed.

9. The method according to claim 1, wherein said detecting the first angular rate of rotation of the vehicle and said detecting the second angular rate of rotation of the vehicle are performed simultaneously while the vehicle experiences significant rate of change of rotation about the second axis.

10. The method according to claim 1, further comprising:
storing a first parameter representative of the first angular rate of rotation of the vehicle in a computer-readable data storage; and
storing a second parameter representative of the second angular rate of rotation of the vehicle in the computer-readable data storage.

11. The method according to claim 10, wherein said estimating the angular position of the vehicle is performed by a processor using the first parameter representative of the first angular rate of rotation of the vehicle and the second parameter representative of the second angular rate of rotation of the vehicle.

12. The method according to claim 1, wherein said estimating the angular position of the vehicle comprises determining the inverse tangent of a ratio of said first angular rate of rotation and said second angular rate of rotation.

13. The method according to claim 1, further comprising calibrating an alignment of the first and second angular rate sensors with the vehicle.

14. The method according to claim 13, wherein said calibrating the alignment is performed periodically when GNSS signals are available.

15. An apparatus configured to be mountable to a vehicle for determining an angular position of the vehicle, comprising:
a first angular rate sensor configured to detect a first angular rate of rotation of the vehicle about a first axis of rotation;
a second angular rate sensor configured to detect a second angular rate of rotation of the vehicle about a second axis of rotation, the second axis of rotation being substantially orthogonal to the first axis of rotation; and
a processor configured to estimate the angular position of the vehicle based on a ratio of the first angular rate of rotation of the vehicle and the second angular rate of rotation of the vehicle.

16. The apparatus according to claim 15, wherein the angular position comprises a pitch of the vehicle.

17. The apparatus according to claim 16, wherein the processor is configured to estimate the pitch of the vehicle in accordance with:

$$\theta = \tan^{-1}\left(\frac{-G_X}{G_Z}\right)$$

where $G_X$ is the first angular rate of rotation, $G_Z$ is the second angular rate of rotation, and $\Theta$ is the estimated pitch of the vehicle.

18. The apparatus according to claim 16, wherein the processor is configured to estimate a change in altitude of the vehicle using the estimated pitch of the vehicle.

19. The apparatus according to claim 16, wherein the processor is configured to estimate a position of the vehicle in three dimensions using the estimated pitch of the vehicle.

20. The apparatus according to claim 16, wherein the processor is configured to resolve a rate of change of heading of the vehicle using the estimated pitch of the vehicle and wherein the processor is configured to resolve the rate of change of heading using the estimated pitch of the vehicle only when a yaw rate of the vehicle exceeds a threshold yaw rate value.

21. The apparatus according to claim 15, wherein the angular position comprises a roll of the vehicle.

22. The apparatus according to claim 15, wherein said first axis of rotation coincides with a roll axis of the vehicle and said second axis of rotation coincides with a yaw axis of the vehicle.

23. The apparatus according to claim 15, wherein the apparatus is configured to detect the first angular rate of rotation of the vehicle and the second angular rate of rotation of the vehicle simultaneously while the vehicle experiences significant rate of change of rotation about the second axis.

24. The apparatus according to claim 15, wherein the apparatus is configured to detect the first angular rate of rotation of the vehicle and the second angular rate of rotation of the vehicle simultaneously while the vehicle experiences a rate of change of rotation about the first axis that is negligible and wherein the apparatus is configured to detect the first angular rate of rotation of the vehicle and the second angular rate of rotation of the vehicle while the vehicle travels upon a curved ramp.

25. The apparatus according to claim 15, further comprising a computer-readable date storage configured to store a first parameter representative of the first angular rate of rotation of the vehicle and a second parameter representative of the second angular rate of rotation of the vehicle.

26. The apparatus according to claim 25, wherein the processor is configured to estimate the angular position of the vehicle using the first parameter representative of the first angular rate of rotation of the vehicle and the second parameter representative of the second angular rate of rotation of the vehicle.

27. The apparatus according to claim 15, wherein the processor is configured to estimate the angular position of the vehicle by determining the inverse tangent of the ratio of said first angular rate of rotation and said second angular rate of rotation.

28. The apparatus according to claim 15, wherein the processor is configured to calibrate an alignment of the first and second angular rate sensors with the vehicle.

29. The apparatus according to claim 28, wherein the processor is configured to calibrate the alignment periodically when GNSS signals are available.

30. A method of determining an angular position of a vehicle, comprising:

detecting a first angular rate of rotation of the vehicle about a first axis of rotation using a first angular rate sensor mounted to the vehicle;

detecting a second angular rate of rotation of the vehicle about a second axis of rotation using a second angular rate sensor mounted to the vehicle, the second axis of rotation being substantially orthogonal to the first axis of rotation;

estimating the angular position of the vehicle using the first angular rate of rotation of the vehicle and the second angular rate of rotation of the vehicle; and estimating a change in location of the vehicle using the estimated angular position of the vehicle.

31. The method according to claim 30, wherein the vehicle experiences a rate of change of rotation about the first axis that is negligible while said detecting the first angular rate of rotation of the vehicle and said detecting the second angular rate of rotation of the vehicle are performed.

32. The method according to claim 30, wherein the angular position comprises a pitch of the vehicle and the method further comprises resolving a rate of change of heading of the vehicle using the estimated pitch of the vehicle.

33. The method according to claim 30, wherein said estimating the angular position of the vehicle comprises determining the inverse tangent of a ratio of said first angular rate of rotation and said second angular rate of rotation.

34. An apparatus configured to be mountable to a vehicle for determining an angular position of the vehicle, comprising:

a first angular rate sensor configured to detect a first angular rate of rotation of the vehicle about a first axis of rotation;

a second angular rate sensor configured to detect a second angular rate of rotation of the vehicle about a second axis of rotation, the second axis of rotation being substantially orthogonal to the first axis of rotation; and a processor configured to estimate the angular position of the vehicle using the first angular rate of rotation of the vehicle and the second angular rate of rotation of the vehicle and the processor configured to estimate a change in location of the vehicle using the estimated angular position of the vehicle.

35. The apparatus according to claim 34, wherein the apparatus is configured to detect the first angular rate of rotation of the vehicle and the second angular rate of rotation of the vehicle simultaneously while the vehicle experiences a rate of change of rotation about the first axis that is negligible.

36. The apparatus according to claim 34, wherein the angular position comprises a pitch of the vehicle and the method further comprises resolving a rate of change of heading of the vehicle using the estimated pitch of the vehicle.

37. The method according to claim 34, wherein said estimating the angular position of the vehicle comprises determining the inverse tangent of a ratio of said first angular rate of rotation and said second angular rate of rotation.

* * * * *